United States Patent
Gratrix et al.

(10) Patent No.: US 7,953,187 B2
(45) Date of Patent: May 31, 2011

(54) LIKELIHOOD DETECTOR APPARATUS AND METHOD

(75) Inventors: Sam Gratrix, Warwick (GB); Robert Jackson, Warwickshire (GB); Oleg Zaboronski, Warwickshire (GB)

(73) Assignee: Forte Design Systems Limited, Surrey (GB)

( * ) Notice: Subject to any disclaimer, the term of this patent is extended or adjusted under 35 U.S.C. 154(b) by 960 days.

(21) Appl. No.: 11/766,540

(22) Filed: Jun. 21, 2007

(65) Prior Publication Data
US 2008/0002791 A1    Jan. 3, 2008

Related U.S. Application Data

(60) Provisional application No. 60/805,376, filed on Jun. 21, 2006.

(51) Int. Cl.
H04L 27/06 (2006.01)
(52) U.S. Cl. .......................... 375/341; 375/229
(58) Field of Classification Search .................. 375/341, 375/229, 316
See application file for complete search history.

(56) References Cited

U.S. PATENT DOCUMENTS

| | | | | |
|---|---|---|---|---|
| 5,488,633 | A * | 1/1996 | Laroia | 375/262 |
| 2002/0094043 | A1 * | 7/2002 | Chu et al. | 375/346 |
| 2007/0047121 | A1 * | 3/2007 | Eleftheriou et al. | 360/51 |
| 2007/0189424 | A1 * | 8/2007 | Haratsch | 375/340 |

FOREIGN PATENT DOCUMENTS

GB    2425027 A    10/2006

OTHER PUBLICATIONS

Altekar, S. A., "Improvements in Detectors Based Upon Colored Noise", IEEE Transactions on Magnetics, 34(1), (Jan. 1998), 94-97.
Kavcic, A., et al., "The Viterbi Algorithm and Markov Noise Memory", IEEE Transactions on Information Theory, vol. 46, (2000), 291-301.
E. Eleftheriou et al., "Improving performance of PRML/EPRML through noise prediction", IEEE Transactions on Magnetics, vol. 32, No. 5 part 1, pp. 3968-3970, Sep. 1996.
K.C Indukumar, State reduction in Viterbi detector using preliminary decisions, IEEE Transactions on Magnetics, vol. 37, Issue: 4, part 1, pp. 1899-1901, Jul. 2001.

* cited by examiner

*Primary Examiner* — Chieh M. Fan
*Assistant Examiner* — Freshteh N Aghdam
(74) *Attorney, Agent, or Firm* — Schwabe, Williamson & Wyatt, P.C.

(57) ABSTRACT

A method and apparatus for receiving a stream of data values from a data medium, wherein the received data values correspond to ideal values but may include added noise that is dependent on previous noise and dependent on data on the data medium, said ideal values being determined by possible values of data on the medium, and for outputting information specifying a sequence of states corresponding to the stream of received data values, said sequence of states corresponding to possible data values on the medium, the apparatus comprising: a first detector, for calculating state sequence likelihood information based on a first noise model and received data values, and for providing said state sequence likelihood information to a second detector; a second detector for calculating weighting values indicating likelihoods that a data value received at a particular time corresponds to a particular state transition, using a second noise model, received data values, and state sequence likelihood information from the first detector; a traceback unit for determining a most likely sequence of data values using said calculated weighting values; and an output for outputting information specifying said determined sequence of states.

26 Claims, 8 Drawing Sheets

PRIOR ART

PRIOR ART

LIKELIHOOD DETECTOR APPARATUS AND METHOD

RELATED APPLICATION

This application claims priority under 35 U.S.C. 119(e) from U.S. Provisional Patent Application Ser. No. 60/805,376, filed Jun. 21, 2006, which application is incorporated herein by reference.

The present invention relates to state sequence likelihood detectors such as Viterbi detectors, and in particular, to such detectors that are adapted to allow for noise, e.g. data-dependent correlated noise, when calculating an output.

In diverse areas such as hard disk drive technology, the theory of error-free communication, adaptive planning, and the theory of traffic flows, it is of great practical importance to solve the problem of finding a most probable sequence of ideal states corresponding to a sequence of measured data, where the measured data is noisy and the ideal states correspond to removal or reduction of this noise. In applications related to communication theories, most probable path-searching algorithms are used to reduce noise from signals transmitted over noisy channels (CDMA2000, Gigabit internet, etc), combat both inter symbol interference and channel noise in magnetic and optical storage devices, maintain communications with deep space research probes (e.g. Galileo).

A sequence of state transitions can be visualised as a path on a trellis diagram. The problem of finding the most probable sequence of states reduces to the problem of finding the path of lowest weighting on a trellis, whose branches are equipped with weightings which are real numbers called branch metrics. Finding the most likely path on a trellis can be solved by techniques of likelihood detection. Optimal likelihood detection techniques are known as maximum likelihood detection, although sub-optimal techniques are also known to be used, e.g. in situations where maximum likelihood detection would be too computationally difficult or expensive. A common technique, used in both maximum likelihood detection and in sub-optimal detection, is the Viterbi algorithm.

One example is in magnetic or optical disk technology, where recording densities have significantly increased in recent years. To achieve high throughput and low error rate requirements, modern read-channel implementations have to take into account inter symbol interference (ISI) and noise which is dependent on previous samples of noise and on data written on the disk.

In a read channel the noisy signal read at time i is $$r_i = y_i + n_i$$

where the noiseless signal read at time i is $$y_i = G \cdot (x_i, x_{i-1}, x_{i-2}, \ldots x_{i-I})$$

and G is an (I+1)-dimensional vector describing inter-symbol interference. Parameter I is called inter-symbol interference length. The noise at time i is $n_i$.

The Viterbi algorithm is used to infer the sequence of recorded bits on the disk from the sequence of received signals. This algorithm finds the optimal path on the trellis whose states are labelled by all possible sequences of recorded bits of given length. Each new recorded bit causes a transition on the trellis between two states s and s' at time i and i+1 connected by a branch b. The optimal path is characterized by the smallest sum of the transition weights assigned to its branches, these weights are called branch metrics. Thus if $m_i(s)$ is the cumulative path metric for the surviving path leading to state s at time i and $y_i$ is the branch label representing the noiseless signal associated with branch b, the cumulative metric is updated as $m_{i+1}(s') = \min\{m_i(s) + [r_i - y_i]^2\}$ where the minimum is taken over all branches ending at state s' with starting state s. The branches that give the minimum values are used to extend the surviving paths in the trellis. Such a detector is optimal if the noise is uncorrelated Gaussian, e.g. additive Gaussian white noise (AGWN). In the presence of other types of noise, different branch metric can be used to improve the performance. Factors such as misequalisation, timing error and jitter, inter-track interference, DC-offset, non-linear bit shift, overwrite, particulate noise, transition noise and percolation can result in correlated noise effects.

To illustrate how the Viterbi algorithm is used, we now consider an example of convolution encoding and subsequent signal detection. Convolution encoding is a bit level encoding technique where each coded bit is generated by convolving the input bit with the past input bits. This can be done by temporarily storing past input bits in delay elements such as flip flops or other memory or storage elements. Thus the information content of each input bit is spread over a number of coded bits, improving the error resistance of the data. The constraint length K of the convolution encoder is the number of bit shifts over which a single input bit can influence the encoder output. Convolution encoding occurs in a hard disk read system. Each bit on the disk surface generates a magnetic field, which is detected by the disk read head in order to read the bit. However, the read operation is also affected by the magnetic field produced by the neighbouring bits. Thus, any data value obtained in a read operation actually corresponds to a convolution of magnetically recorded bits on the disc, known as inter symbol interference (ISI).

A convolution encoder may be modelled by a generator polynomial G(D), which describes the number of bits influencing the encoder output, and the magnitude of each bit's influence. The generator polynomial has the formula:

$$G(D) = \sum_{n=0}^{K-1} g_n D^n,$$

where $D^n$ is a delay operator representing a delay of n time units, K is the encoder constraint length and $g_n$'s are real numbers, which describe the weight with which past transitions contribute to the current reading.

A simple example of a convolution encoder has a generator polynomial G(D)=1−D. This encoder has a single delay element for storing a previous input, and produces an output equal to the current input minus the previous input. Thus, the encoder operates on the input data $x_i$ to give an output of $G(D)x_i = x_i - Dx_i$. The delay operator acts to represent the previous (delayed) input, thus $Dx_i = x_{i-1}$, and $G(D)x_i = x_i - x_{i-1}$. The constraint length is 2 because each input bit influences the output over two bit shifts.

FIG. 1 shows a block diagram of a prior art apparatus for transmission and reception of convolution encoded data. The apparatus includes a convolution encoder 100, with generator polynomial G(D)=1−D. The apparatus of FIG. 1 may represent a communications system, with deliberate convolution encoding of data to increase noise resistance during transmission through a channel. However, it may also represent a hard disk read process, in which the convolution encoding is not deliberate, but is a result of inter symbol interference caused by the magnetic fields of the individual data bits on the disk.

The encoder 100 performs convolution encoding of a stream of input data. The data is then sent over a noisy channel. Noise source 106 represents the effect of noise during transmission of the data. The transmitted data is then received and decoded by a detector 108.

The encoder 100 has an input 101 for accepting a stream of time dependent input binary data $x_i$, where i represents the time interval. The input data is received by the encoder at a rate of k bits/second. The input 101 of the encoder 100 is connected to an encoder delay element 102. The delay element 102 stores a single bit of data, corresponding to the input bit $x_i$ at time i, and outputs this data bit at the following time interval i+1. Thus, at time i, the output of the delay element is $x_{i-1}$. The output of the delay element 102 is connected to a multiplication unit 103 which multiplies the output value $x_{i-1}$ by minus one, giving an output of $-x_{i-1}$. The encoder 100 has a sum unit 104 which is connected to both the encoder input 101 and the output of the multiplication unit 103. The signals $x_i$ and $-x_{i-1}$ are summed by the sum unit 104, to give an output signal of $y_i = x_i - x_{i-1}$.

The encoder output signal $y_i$ is sent from the output 105 of the encoder 100 via a channel, such as a radio link, a wire, or any other form of data transmission channel, to a detector 108. Noise source 106 represents noise $n_i$ generated as the signal $y_i$ passes through the channel. This may be any type of noise, for example, decorrelated noise such as white noise or Gaussian white noise. A sum unit 107, with inputs connected to the noise source 106 and the encoder output 105, represents the addition of the noise $n_i$ to the data $y_i$. Thus, the signal received after the data has passed through the noisy channel is $r_i = y_i + n_i$. The detector 108 receives the signal $r_i$, and the detector then performs a detection and convolution decoding process.

The Viterbi Algorithm (VA) is a recursive procedure which can be most easily described when used with a known initial state at time t=0, and a known final state at time t=T. VA allows the most likely sequence of states at intermediate times to be found. FIG. 2A shows an example of a two-state trellis diagram which can be used to visualise the VA process. The trellis diagram is a state transition diagram which graphically represents all of the possible states of the system over a sequence of time intervals. The horizontal axis of the trellis represents time, starting at time t=0 at the left hand side of the trellis, and ending with time t=T at the right hand side of the trellis. The vertical axis represents the possible states of the finite state machine. In this example, these possible states are zero and one, corresponding to the possible input states $x_i$ of the convolution encoder of FIG. 1. Pairs of possible states at adjacent time intervals are connected by lines, with each line representing a state transition to a different state or to an identical state during one time interval. The possible sequences of states over the whole of the time period are represented by the possible paths along the trellis. At time t=0, the system is pre-set to state zero. At the next time interval, t=1, the state may remain as zero or change to one. This is represented by the darker upper and lower lines of the trellis between t=0 and t=1. A change of state from zero to one is represented by the upper line, extending diagonally upwards to connect to one, and a sequence of all zero states is represented by the lower line, extending horizontally to connect to zero. At time t=1, if the system is in state one, it may follow one of two routes, i.e. remain at one, or change to zero. Similarly, if the system is in state zero, it may follow one of a further two routes, i.e. remain at zero, or change to one. At the final time t=T of the trellis of FIG. 2A, the system is reset to zero, thus only state zero is a possible state.

As can be seen from FIG. 2A, the trellis contains one or more paths between each possible initial and final state. For instance, there are two different paths from the "zero" state at time t=0 to the "zero" state at t=2. These paths are 010 and 000, where the first bit represents the state at time t=0, the second bit represents the state at time t=1, and the third bit represents the state at time t=2. FIG. 2B shows an identical trellis to FIG. 2A, with these two paths in bold lines. VA involves identifying paths between any possible states at time t−1, and each possible state at time t. If more than one path connects from t−1 to a particular state at time t, then VA chooses which of these paths corresponds to the most likely state sequence. Then, the least likely paths are eliminated. The remaining path is called the survivor.

The most likely path through the trellis can be determined using numbers known as branch metrics, which indicate the relative likelihoods of each of the possible state transitions in the trellis occurring. The branch metrics for each time interval may depend on the previous encoder state, and the new encoder input. The number shown beside each line in the trellis in FIGS. 2A and 2B are the branch metrics. In one example, relating to FIG. 1, branch metrics may be obtained using the expected values $y_i$ of the received data $r_i$ and the actual values $r_i$ of the received data. The branch metrics in a path from time $t_1$ to time $t_2$ can be summed to indicate the likelihood of that path occurring. These sums of branch metrics are known as path metrics.

To find a survivor at a given state at t=t+1, the path metrics of all paths leading to this state are computed by adding appropriate branch metrics to path metrics of survivors at time t and choosing the path of lowest path metric (i.e. the highest likelihood path) leading to this state. This procedure is called add-compare-select operation and it has to be performed for all states at t=t+1. As t=T is reached, there will be only one survivor left, with probability $P = 1 - C_1 \cdot \exp(-C_2 \cdot T)$, where $C_1$ and $C_2$ are constants. Thus, the probability P approaches 1 as time T increases and $C_1 \cdot \exp(-C_2 \cdot T)$ becomes small.

VA is capable of reducing the amount of de-correlated noise, such as Gaussian white noise, from received data. VA may also be used to reduce the amount of coloured noise, if the correlation length of the noise is small enough.

FIG. 3 illustrates the use of VA by the detector 108 of FIG. 1, to detect the received data $r_i$, and output a corresponding sequence of values indicating the estimated encoder input values of highest likelihood. A series of eight trellis diagrams are shown, representing eight steps of the VA decoding process. A ninth trellis diagram shows a trace-back of the optimal path through the trellis. Again, the numbers on the trellis diagrams represent branch metrics, indicating the likelihood that received data corresponds to particular state transitions. Each trellis diagram is similar to that described with reference to FIGS. 2A and 2B, i.e. it has two possible states which are one and zero. These also represent the possible values of $x_{i-1}$, which are sequentially stored in the delay element 101.

The trellis extends from a known state of zero at time t=0 to a known state of zero at time t=T. A path through the trellis represents a sequence of data which is input to the encoder. Any unique data sequence input to the encoder has a unique path through the trellis. The initial state of each trellis is set to zero, by pre-setting the delay element to zero, i.e. setting the first value of $x_i$ to zero. The information which is to be convolution encoded and transmitted then begins with the second value of $x_i$. At the end of the information, an extra zero character is added to allow the last character of the information to be fully convolution encoded. It is not essential that this initial and final state should be zero, but in this example, their values should be known by the detector.

The states of the trellis, with a value of zero or one, represent possible values of $x_{i-1}$, where $x_{i-1}$ is a possible value of the convolution encoder input, which is stored in the delay element 102. The possible values of the convolution encoder output, $y_i = x_i - x_{i-1}$, are thus represented by the slope of the lines connecting two states of the trellis at adjacent time intervals i−1 and i. The values of $y_i$ are known as "branch labels", and they represent ideal values of the received data, without any added noise $n_i$. Lines with a zero slope, (such as the line between state zero at t=0 and state zero at t=1) correspond to $y_i=0$. Lines with a left-to-right upwards slope (such as the line between state zero at t=0 and state one at t=1) correspond to $y_i=1$. Lines with a left-to-right downwards slope (such as the line between state one at t=1 and state zero at t=2) correspond to $y_i=-1$.

When the detector receives the transmitted signal, this signal $r_i$ may include noise $n_i$. Thus, the problem to be solved by the detector is to determine the most likely path through the trellis (i.e. the most likely sequence of characters input to the encoder), based on the noisy received signal. The branch metrics are assigned to the trellis to indicate the likelihood of each state corresponding to the received signal at that time. For additive Gaussian white noise (AGWN), the branch metrics can be calculated as $(r_i-y_i)^2$, i.e. the square of the difference between the received value $r_i$ and the expected value $y_i$ at that point in the trellis. The most likely path is the path with the lowest path metric.

When the formula $(r_i-y_i)^2$ is used to calculate branch metrics for the two-state trellis of FIG. 3, it is common to get a lot of different paths having equal path metrics. It may not always be possible, therefore, to choose a single path of greatest likelihood, because one of two equally likely paths must be chosen. Therefore, for the purposes of illustrating the technique of finding a unique path through the trellis using VA, the values shown on FIG. 3 as branch metrics have not been calculated from a sample set of received data $r_i$, but instead, small integers have been chosen for each branch metric to ensure different weights for each path.

In practice, although the presence of multiple paths of equal likeliness degrades the VA performance, it is often possible to pre-process the data to avoid getting large numbers of equally likely paths.

The first trellis diagram, at the top of FIG. 3, corresponds to step 1 of the detection and/or decoding process. Step 1 concerns the time interval between t=0 and t=1. The state of the system at t=0 is zero, because the delay element was preset to zero before data transmission began. Two possible paths through the trellis during the first time interval are identified as bold lines on the trellis. These correspond to data sequences of 00 and 01 respectively, where the first bit represents the state at time t=0 and the second bit represents the state at time t=1. The 00 path is the lower of the two paths in the trellis, and the 01 path is the upper of the two paths in the trellis. The 00 path has a path metric of 0, but the 01 path has a path metric of 2. As only a single path is formed between the initial state at time t=0 and the next state at t=1, no reduction of the trellis is performed at step 1.

The second trellis corresponds to step 2 of the decoding process. The part of the trellis between t=0 and t=2 is now considered. A total of four paths are now possible, namely, 000, 001, 010 and 011, where the first two bits represent the possible paths in step 1, and the third bit represents the state at time t=2. The path metric of each path may be calculated by adding all the branch metrics on the path. Thus, the path metric of 000 is 0+2=2, of 001 is 0+0=0, of 010 is 2+1=3, and of 011 is 2+1=3. The paths 000 and 010, with path metrics of 2 and 3 respectively, both lead to a final state of 0 at time t=2. Therefore, the 010 can be eliminated, as it has the highest path metric, and the 000 path is the survivor. Similarly, the paths 001 and 011, with path metrics of 0 and 3 respectively, both lead to a final state of 1 at time t=2. Thus, the 011 path can be discarded, and the 001 path is the survivor. The two survivor paths, 001 and 000, are shown in bold on the trellis diagram.

In step 3 of the process, the part of the trellis up to t=3 is considered. The four new possible paths are 0010, 0011, 0000 and 0001, with path metrics of 0, 0, 3 and 4 respectively. The paths 0000, with path metric 3, and the path 0001, with path metric 4, can both be eliminated, as these have highest path metrics for final states 0 and 1 respectively. Thus, the survivors are 0010 and 0011, each with a path metric of 0.

In step 4 of the process, the part of the trellis up to t=4 is considered. The four new possible paths are 00100, 00101, 00110 and 00111, with path metrics of 1, 2, 2 and 0 respectively. The paths 00101 and 00110 can be eliminated, as these have highest path metrics for final states 1 and 0 respectively. Thus, the survivors are 00100 and 00111, each with a path metric of 0.

In step 5 of the process, the part of the trellis up to t=5 is considered. The four new possible paths are 001000, 001001, 001110 and 001111, with path metrics of 3, 3, 1 and 0 respectively. The paths 001000 and 001001 can be eliminated, as these have highest path metrics for final states 0 and 1 respectively. Thus, the survivors are 001110 and 001111, with path metrics of 1 and 0 respectively.

In step 6 of the process, the part of the trellis up to t=6 is considered. The four new possible paths are 0011100, 0011101, 0011110 and 0011111, with path metrics of 3, 2, 2 and 1 respectively. The paths 0011100 and 0011101 can be eliminated, as these have highest path metrics for final states 0 and 1 respectively. Thus, the survivors are 0011110 and 0011111, with path metrics of 2 and 1 respectively.

In step 7 of the process, the part of the trellis up to t=7 is considered. The four new possible paths are 00111100, 00111101, 00111110 and 00111111, with path metrics of 2, 4, 3 and 3 respectively. The paths 00111110 and 00111101 can be eliminated, as these have highest path metrics for final states 0 and 1 respectively. Thus, the survivors are 00111100 and 00111111, with path metrics of 2 and 3 respectively.

In step 8 of the process, the part of the trellis up to t=8 is considered. At t=8, the state is set to zero, since a reset signal will be sent at the end of each transmission. Thus, there are only have two paths to consider instead of four. The two paths are 001111000, 001111110, with path metrics of 2 and 4 respectively. As both paths have the same final state, the path 001111110, which has the highest path metric, can be eliminated. Thus, the only survivor is 001111000, with a path metric of 2.

The ninth trellis shows trace-back of the path with the lowest overall path metric, where only the final survivor path is shown in bold, and dead-end paths are no longer shown in bold.

In the absence of any additional noise $n_i$, the received data input to the detector or decoder is an "ideal input". For a trellis of finite length, an ideal input is a sequence of received data with a corresponding path in the trellis which has a path metric of zero. In other words, for an ideal input, there is a corresponding path which has a sequence of branch labels which is equal to the sequence of received data.

High speed implementations of maximal likelihood detectors (MLDs) rely on a simultaneous computation of a large number of branch metrics of length n, where n is the number of time steps of the trellis processed in parallel. Such detector designs are referred to as radix-$2^n$ designs. It is often convenient to choose n to be equal to the constraint length of the detector. The constraint length is the smallest number of time steps on the trellis for which loops, i.e. multiple paths connecting a given state at time T to a given state at time (T+n), appear. The calculation of a large number of branch metrics is both time and area consuming, and this is a limiting factor in a high speed detector design.

An increase in the detector's throughput can be achieved by increasing its radix. However, the area penalty for such increase can be significant. For example, a radix-32 detector requires the computation of branch metrics for paths connecting each of 16 initial states to each of 16 final states, where two paths are obtained for each connection. This is 512 different paths on the corresponding trellis. If this computation is performed in 512 independent blocks, the total area of the branch metric block alone will be approximately 512×10000 $\mu m^2 \approx 5$ mm$^2$. In comparison, the total area of currently used high speed radix-4 detectors is approximately 0.6 mm$^2$.

In an article entitled "The Viterbi algorithm and Markov noise memory", published in IEEE Transactions on Information Theory, vol. 46. pp. 291-301, January 2000, Kavcic and Moura show that the noise in a modern read channel is well approximated by the so-called Markov noise model and is dependent on both previous noise samples and data recorded on the disk, that is data dependent and correlated:

$$n_i = \sigma(d) W_i(0,1) + b(d) n_{i-1}.$$

Where $n_i$ is the noise sample at time i.

$d = (x_i, x_{i-1}, x_{i-2}, \ldots, x_{i-D+1})$ is the vector of D most recent recorded data bits. Parameter D is called data dependence length.

$\{W_i(0,1)\}_{i=-\infty}^{i=\infty}$ are independent identically distributed standard Gaussian random variables.

$\sigma(d)$ is data-dependent noise variance.

$b(d)$ is an L-dimensional vector of correlation coefficients.

$n_{i-1} = (n_{i-1}, n_{i-2}, \ldots, n_{i-L})$ is the vector of L past noise samples.

Parameter L is called Markov length. In Kaveic and Moura's model, the parameters D, I and L satisfy an inequality $$D \leq L + I + 1$$

Kavcic and Moura disclose an optimal Viterbi detector in the presence of Markov noise. They also show that the required branch metric (BM) is given by $$BM = \ln \sigma^2(d) + 1/\sigma^2(d)((r_i - y_i, \ldots, r_{i-L} - y_{i-L}) \cdot (1, -b(d))^2$$

The BM is obtained from the noise model. The BM depends on the most recent recorded bit $x_i$ and I+L past bits $x_{i-1}, x_{i-2}, \ldots, x_{i-L-1}$. Therefore, for the BM to be the function of the trellis state and the most recent transition, the trellis' states must be labelled by sequences of recorded bits of length I+L. Such a trellis will have $2^{I+L}$ states.

The major drawback of Kavcic and Moura's method is that it results in very area intensive silicon implementation since the viterbi detector requires a trellis with $2^{I+L}$ states. Modern read channels are characterised by large ISI and Markov lengths. As a result, the number of states of optimal Viterbi detector can be as high as 256. This is a huge increase in the number of states compared with venerable 16-state E$^2$PR4 detector. Consequently, VLSI implementations of optimal data-dependent Viterbi detectors are too large and/or too slow to satisfy requirements of modern read channel.

In alternative models where the data dependence length D is greater than L+I+1, the necessary number of states is even higher. Thus, the issue of silicon area usage is even more significant. In general, the number of states required to calculate the branch metric will be the maximum of $2^{L+I}$ and $2^D$. Thus, the number of states grows exponentially with L or with D. L and D grow with the channel density. At present, many detectors are using 8 states, and the next generation detectors are expected to use 16 states.

In GB2425027A, some of the present inventors disclose a sub-optimal detection method using the Gauss-Markov noise model discussed by Kavcic and Moura. This sub-optimal detector requires as few as $2^I$ states instead of the $2^{I+L}$ states needed in Kavcic and Moura's optimal detector, and thus it has the advantage of needing a lot less silicon area. The sub-optimal detector calculates new branch metrics using the $2^I$ state trellis and using an L-step trace-back process to obtain earlier, previously calculated paths of highest likelihood. This produces data patterns of length I+L+1, which is sufficient to determine new pairs of contending branch metrics.

FIG. 4 is a block diagram showing the structure of an apparatus used in this sub-optimal detector system. The apparatus has a noise statistic calculating block 401, which uses the noise model to calculate the noise statistics. The output of the noise statistic calculating block 401 is sent to a branch metric block 402, which performs calculations of branch metrics. The branch metric block uses received data and information about most likely paths for past times, as well as the noise statistics, to calculate branch metrics. The output of the branch metric block 402 is sent to an add-compare-select (ACS) block 403, which uses Viterbi algorithm to determine the path metrics to each state, using the newly calculated branch metrics. The add-compare-select block 403 output is sent to a trace back block 404, which reconstructs the most likely paths in the trellis. This output is also made available to the branch metric block 402, for future branch metric calculations.

However, this type of sub-optimal detector relies on the use of a feedback loop from the ACS block 403 to the branch metric block 402, as shown in FIG. 4, in order to perform this local L-step trace-back. The local trace-back is commonly called "noise-prediction" (NP), although it would be more accurate to describe it as "pattern prediction", as bits of data estimated via a local trace-back process are used not only to estimate noisy samples, but also to determine pattern-dependent statistics of noise. The feedback loop from ACS 403 to branch metric block 402 that is inevitably introduced by pattern prediction is always longer than the standard ACS feedback loop.

A disadvantage of local noise prediction technique is the possibility of propagating errors through the ACS to branch metric feedback loop. This leads to an increased probability of long error bursts at the output of noise predictive Viterbi detector. The application GB2425027A also describes processing blocks of data, to reduce problems with feedback and improve the resistance to error propagation.

Kavcic and Moura also present another method which is similar to a method disclosed by Altekar and Wolf, in an article entitled "Improvements in detectors based upon coloured noise", published in IEEE Transactions on Magnetics, vol. 34, no. 1, pp. 94-97, January 1998. The latter method does not account for data dependent noise. This method takes into account noise correlations without increasing the number of Viterbi Detector's states compared with an optimal white noise Viterbi detector. In this method, received signals are processed in large blocks which require a high radix Viterbi detector. Altekar and Wolf point out that this method may not be practical since high radix Viterbi detectors require a large amount of silicon area.

In this method smaller block size can be chosen. However the method disclosed only account for noise correlations between signals within the block exactly, whereas correlations between data samples in different blocks are neglected.

The drawback of this is that error rate performance suffers due to neglect of inter-block correlations, which can only be improved by increasing the radix at the expense of silicon area.

In an article entitled "Improving performance of PRML/EPRML through noise prediction", published in IEEE Transactions on Magnetics, vol. 32, no. 5 part 1, pp. 3968-3970, September 1996, Eleftheriou and Hirt disclose a method which takes into account noise correlations, but not data dependent noise, without increasing the number of Viterbi Detector's states compared with an optimal white noise Viterbi detector. In their method, past noise samples are estimated using a short local trace-back and subtracted from the current received signal to eliminate the correlated component of noise. The resulting Viterbi detector has $2^I$ states only. However their method does not take into account data dependent noise. Also, a drawback of Eleftheriou and Hirt's method is that it introduces a feedback loop at every time step. A current estimated noise sample is used to estimate noise samples in the future. It is known that this feedback leads to an increased probability of long error bursts and it is known that error correction circuitry following the Viterbi detector is susceptible to long error bursts.

In "State reduction in Viterbi detector using preliminary decisions", Magnetics, IEEE Transactions, Vol: 37, Issue: 4, Part 1, pages: 1899-1901 (July 2001), Indukumar, K. C. discloses a technique to reduce the number of states in the trellis of a conventional partial response Viterbi detector (PR-VD) using preliminary decisions. The preliminary decisions are obtained from a lower order PR-VD which are used to shorten the tail of the higher order partial response. Since it does not use decision feedback to shorten the tail of the higher order PR, it does not suffer from error propagation. Theoretical analysis is carried out to show the influence of error events in the preliminary and reduced state Viterbi detectors on the system performance, and to provide possible ways to effectively implement the scheme. In Indukumar's scheme the estimate of detected data is fed into the front end equalizer and there is no co-ordination between the reduced state Viterbi detector and preliminary Viterbi detector. As a result, Indukumar's scheme can not be used for pattern prediction for a data-dependent Viterbi detector.

The requirements imposed on a modem read channel result in implementations of the Viterbi detector which require large silicon area and struggle to meet desired throughput. Embodiments of the present invention overcome the deficiencies of prior-art methods, and result in improved error rate, reduction in silicon area and high throughput without compromising the data-detection capability of the Viterbi detector.

One aspect of the present invention provides a method and apparatus for receiving a stream of data values from a data medium. The received data values correspond to ideal values but may include added noise that is dependent on previous noise and dependent on data on the data medium. The ideal values are determined by possible values of data on the medium. The apparatus is configured to output information specifying a sequence of states corresponding to the stream of received data values, the sequence of states corresponding to possible data values on the medium. The apparatus includes a first detector and a second detector. The first detector is configured to calculating state sequence likelihood information based on a first noise model and received data values, and to provide the state sequence likelihood information to the second detector. The second detector is configured to calculate weighting values indicating likelihoods that a data value received at a particular time corresponds to a particular state transition, using a second noise model, received data values, and state sequence likelihood information from the first detector. The apparatus also includes a traceback unit configured to determine a most likely sequence of data values using said calculated weighting values, and an output for outputting information specifying said determined sequence of states.

The first noise model, used by the first detector, may be a simpler noise model than the second noise model, used by the second detector. For example, the first noise model may be a white noise model, or a model based on correlated noise and/or data dependent noise with smaller Markov length and/or data dependence length than in the second noise model. The second noise model may be correlated and/or data dependent noise with larger Markov length and/or data dependence length than in the first noise model, or it may be non-Markov noise.

The first detector preferably outputs local trace-back data, i.e. data that is dependent on a possible state of the second detector, rather than outputting a single data value for each time interval that has been determined by the first detector as the most likely data value. Receiving these multiple outputs allows the second detector to calculate its branch metrics using trace-back data particular to each branch.

The first detector may receive a data input from a different equaliser than the second detector. Alternatively, both detectors may receive a data input from the same equaliser.

The latency of the first detector is preferably smaller than the latency of the second detector. The apparatus may include a pipeline memory for feeding output data from the first detector to the second detector.

The output of the first detector may be used for additional purposes, such as for time recovery purposes in a read channel timing loop, for dynamically determining equaliser co-efficients, for statistics tracking purposes, or for any combination of these.

The apparatus may include more that two detectors, arranged as a series of cascaded detectors, to provide a greater level of parallel processing. Thus, in some embodiments, cascaded pre-detectors may be provided to further parallelise the calculations.

The noise statistics may be calculated as separate white noise correlated noise components. The correlated noise components may include noise correlation coefficients which measure the correlation strength between the current noise sample and L most recent noise samples conditional on a sequence of data on the media, where L is the Markov length. The white noise components may include at least one of a logarithm of a white noise strength, and an inverse square of a white noise strength. The noise statistics may be pre-calculated before processing of the received data begins.

The length of the previous most likely sequence of data values which is used for calculation of weighting values, may be determined according to the amount of inter-symbol interference between successive data values on the medium. The number of data values on the medium which are used to determine said noise statistics may be determined according to a noise correlation strength of the noise model.

The detector may be configured to process sequences of encoded data for a chosen size, e.g. the size may be equal to the ISI constraint length. The output values from the detector may be identical to the ideal input values of the detector. However, the output may be an alternative sequence, derivable from the ideal value sequence.

The length of the previous most likely sequence of data values which is used for calculation of weighting values, may be determined according to the amount of inter-symbol interference between successive data values on the medium.

The detector may have a storage means for storing information on preferred paths in the trellis. The size of each said section of input data processed by the detector may be less than 5 times the constraint length, which allows a fast throughput of data. However, this is not essential.

A further aspect of the present invention comprises a likelihood detector apparatus and corresponding method for receiving a stream of data values from a data medium, wherein the received data values correspond to ideal values but may include added noise that is dependent on previous noise and dependent on data on the data medium, and for outputting information specifying a sequence of states corresponding to the stream of received data values, said sequence of states corresponding to possible data values on the medium. The apparatus includes a plurality of cascaded pre-detectors, and a main detector which uses output data from the last of the cascaded pre-detectors. The first pre-detector is configured to calculate state sequence likelihood information based on a first noise model and received data values, and to provide said state sequence likelihood information to a further pre-detector. One or more further pre-detectors are each configured to calculate state sequence likelihood information based on a noise model, received data values and an output from another pre-detector, and to provide said state sequence likelihood information to another of said pre-detectors or to a main detector. The main detector is configured to calculate weighting values indicating likelihoods that a data value received at a particular time corresponds to a particular state transition, based on a second noise model, received data values, and state sequence likelihood information from one of said pre-detectors. The apparatus includes a traceback unit to determine a most likely sequence of data values using said calculated weighting values; and an output for outputting information specifying said determined sequence of states.

In some embodiments, the pre-detectors each use different noise models, although this is not essential. In some embodiments, at least some of the pre-detectors have different sizes and/or different numbers of states. The outputs of any of the pre-detectors may be used for other purposes in addition, e.g. timing purposes, data configuration or filtering purposes, statistics tracking purposes, or any combination of these.

The present invention can be implemented by software or programmable computing apparatus. Thus the present invention encompasses a carrier medium carrying computer readable code for controlling a computer or number of computers to carry out the method. The carrier medium can comprise a transient medium, e.g. an electrical, optical, microwave, RF, electromagnetic, acoustic or magnetic signal (e.g. a TCP IP signal over an IP network such as the internet), or a carrier medium such as a floppy disk, CD ROM, hard disk, or programmable memory device.

Embodiments of the present invention will now be described, by way of example only, with reference to the accompanying drawings, in which.

In the following discussion, the first detector is referred to as a "pre-detector", and the second detector is referred to as a "main detector". However, in later discussed embodiments where more than two detectors are cascaded, the first and second detectors may operate as "pre-detectors", and a third or subsequent detector may operate as a "main detector", i.e. making use of the pre-detector outputs to calculate branch metrics.

Figure 1:
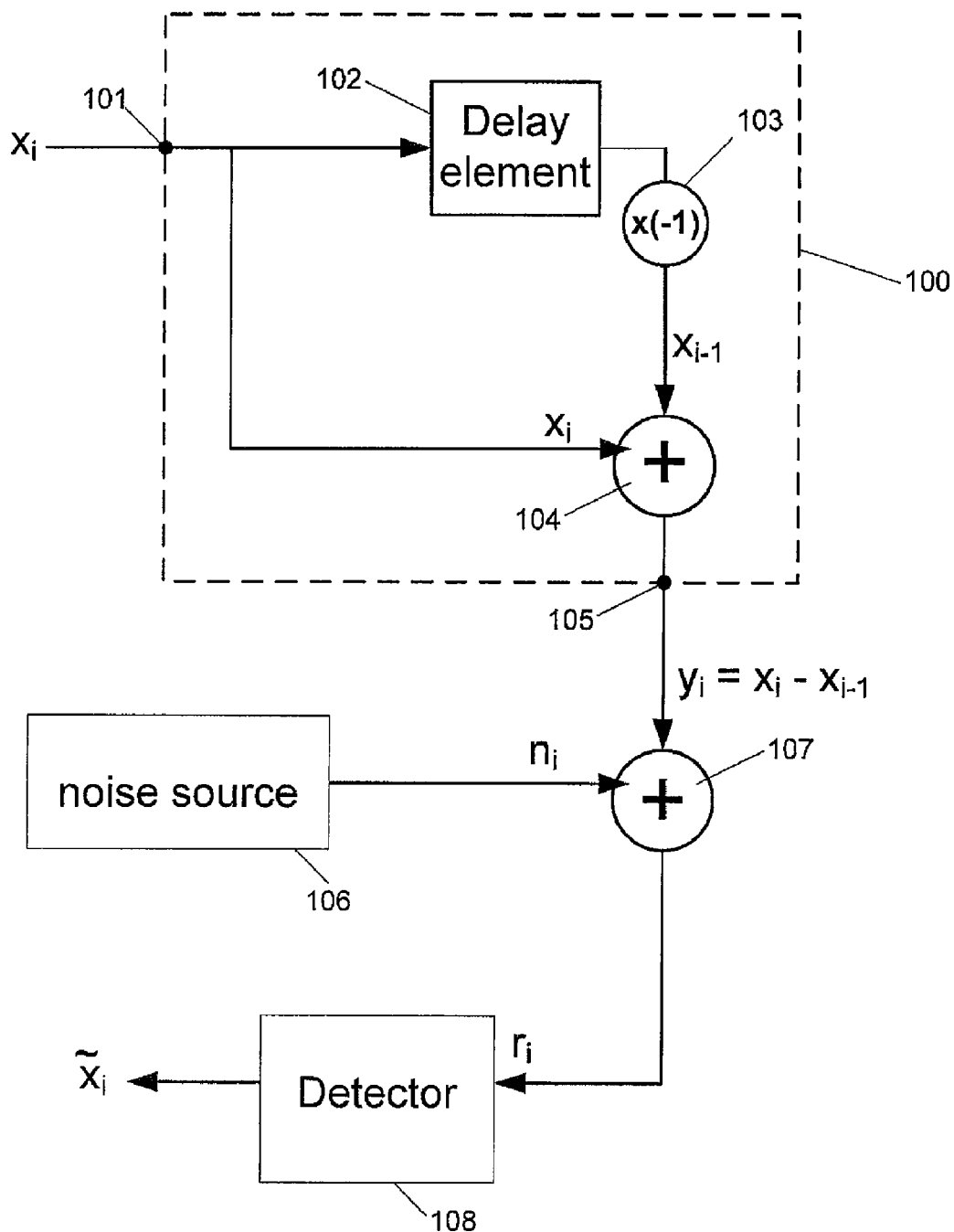
FIG. 1 is a block diagram of an apparatus for convolution encoding and decoding of data, according to the prior art.
Figure 2A:
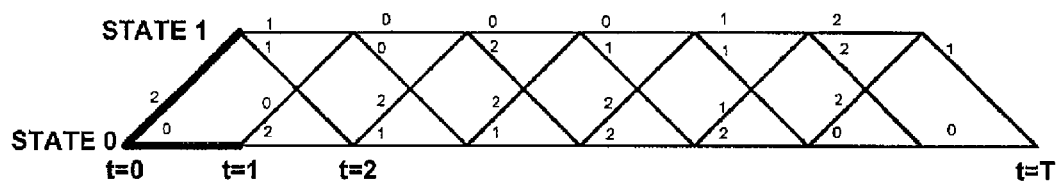
FIGS. 2A and 2B show an example of a trellis diagram representing a two-state time dependent process as known in the prior art.
Figure 2B:
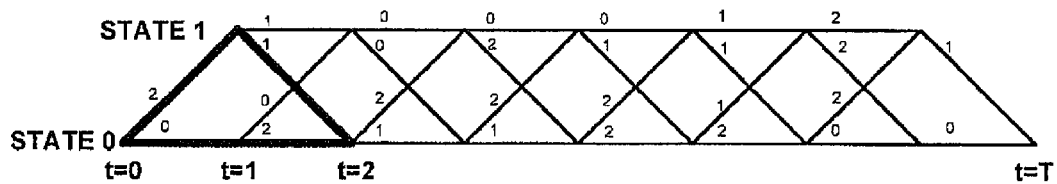
Figure 3:
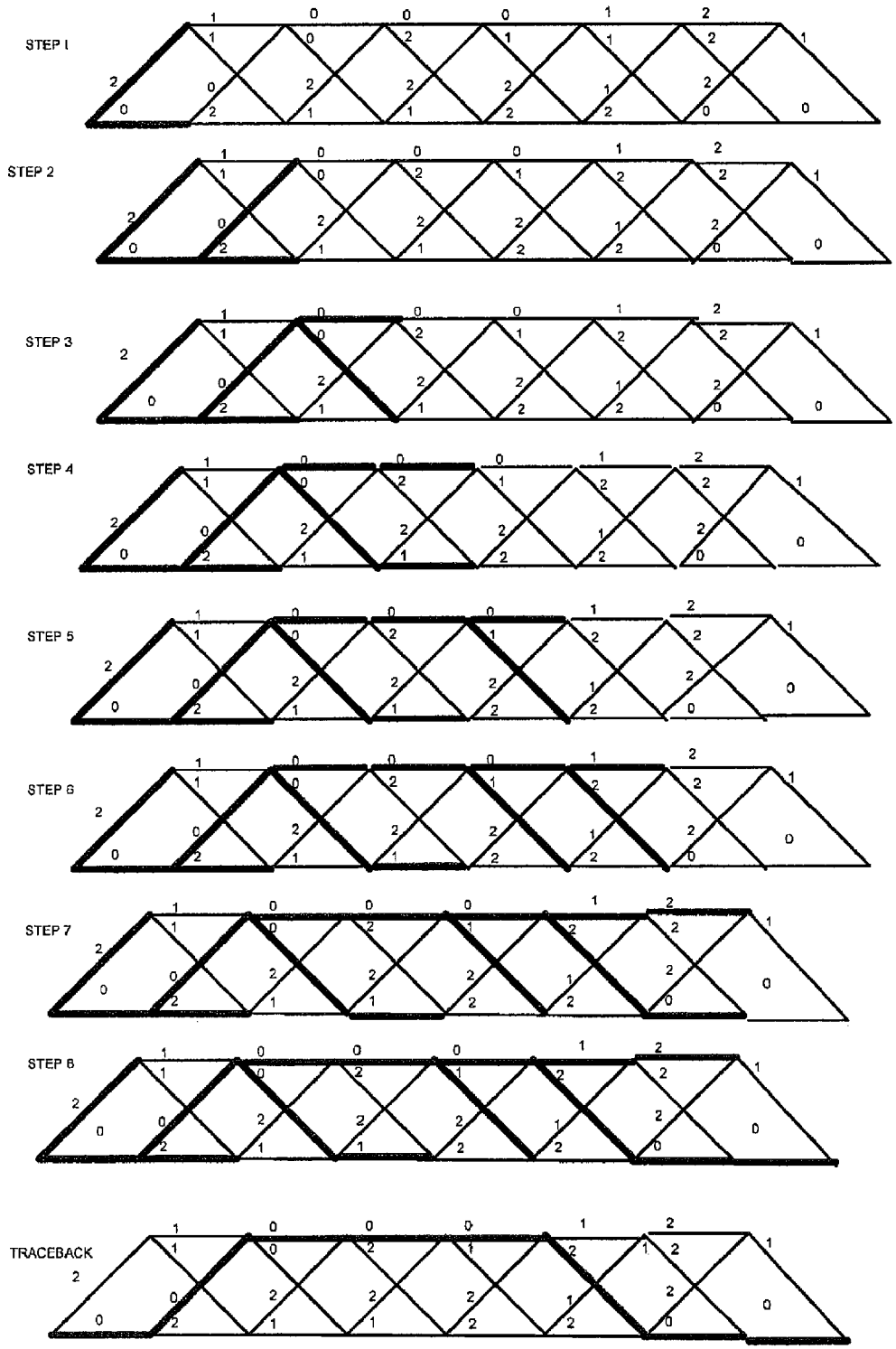
FIG. 3 is a series of trellis diagrams representing a series of steps in a Viterbi decoding process, according to the prior art.
Figure 4:
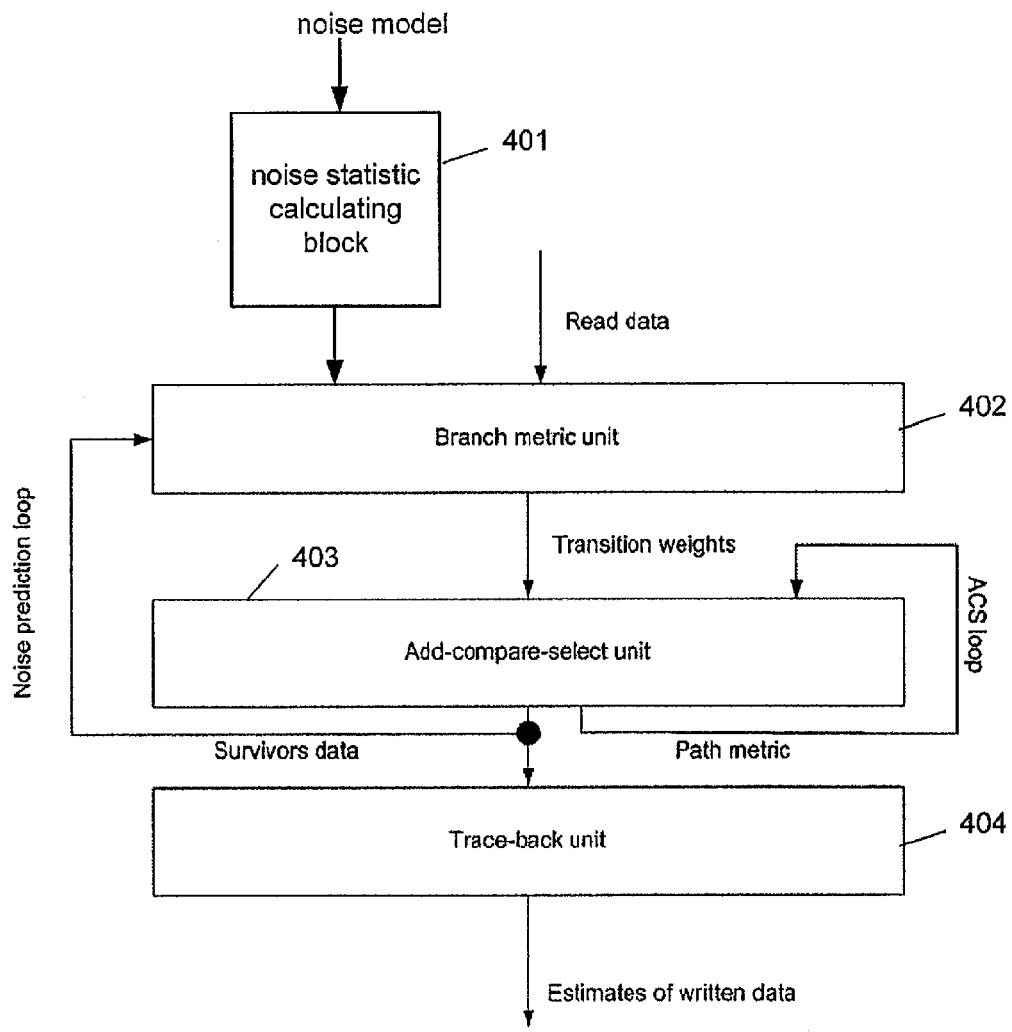
FIG. 4 is a block diagram of a prior art likelihood detector using a NP feedback loop.
Figure 5:
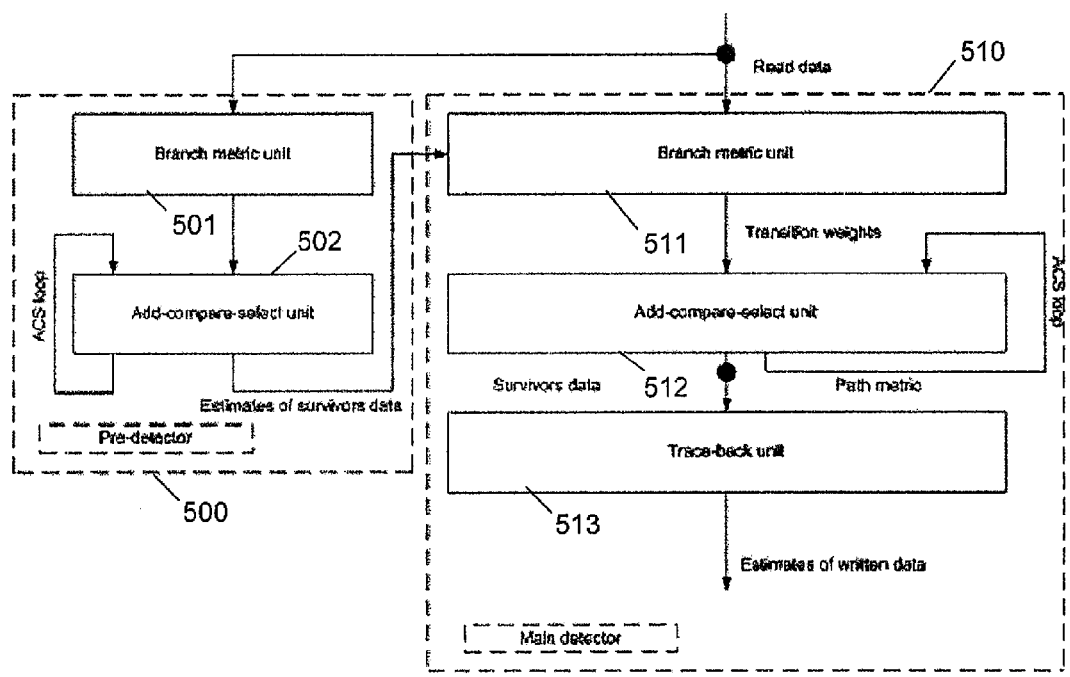
FIG. 5 is a block diagram of a likelihood detector according to an embodiment of the invention.

FIG. 5 is a block diagram showing the structure of an apparatus used in one embodiment of the invention. The apparatus includes a pre-detector 500 and a main detector 510. Each of these detectors has an input for receiving read data.

The pre-detector 500 has a branch metric unit 501, which performs calculations of branch metrics, using a simplified noise model, such as a white noise model. The branch metric unit outputs the calculated branch metrics to an add-compare-select unit 502, which uses Viterbi algorithm to determine path metrics to each state, using the newly calculated branch metrics. This involves an ACS loop feedback process, where survivor data from previous calculations is used in more recent calculations, as part of the Viterbi process.

The add-compare-select block 502 survivor data output is sent to a branch metric unit 511 of the main detector 510, where it is used with the read data in the calculation of branch metrics by the main detector 510. The branch metric unit 511 of the main detector outputs the calculated branch metrics to a main detector add-compare-select unit 512, which uses Viterbi algorithm to determine path metrics to each state of the main detector, using the newly calculated branch metrics, and outputs data on survivor paths through the main trellis. A trace back block 513 in the main detector then reconstructs the most likely paths in the trellis, and outputs an estimate of the original data.

The apparatus may include a noise statistic calculating block (not shown), which uses a suitable noise model to calculate data independent noise statistics, and outputs these noise statistics to the branch metric unit in the main detector and/or pre-detector.

In the following example, a method of calculating the branch metrics is discussed.

Using the Gauss-Markov model, as discussed by Kavcic and Moura, the noise $n_i$ is conditionally Gaussian, with the conditioning on D+1 data bits $x_i x_{i-1} \ldots x_{i-D}$ and L past noise samples. The values $x_i x_{i-1} \ldots x_{i-D}$ are the Markov coefficients. D is the data dependence length and L is the Markov length. The inter-symbol interference (with length I) does not contribute to $n_i$. Typically, $I=D \leq L$, although this is not essential. In the examples now described, we assume that D=I.

The noise $n_i$ may be represented as:

$$n_i = \sigma(x_i x_{i-1} \ldots x_{i-D}) \cdot W_i + \sum_{k=1}^{L} b_k(x_i x_{i-1} \ldots x_{i-D}) \cdot n_{i-k}$$

The first term $(\sigma(x_i x_{i-1} \ldots x_{i-D}) \cdot W_i)$ is known as prediction error, and it is independent of previous noise samples, $n_{i-1}, n_{i-2}$, etc. The term $W_i$ is an independent Gaussian variable with mean zero and variance 1.

Thus, the prediction error $\xi_i = \sigma(x_i \ldots x_{i-D}))_L W_i$ $$\xi_i = n_i - \sum_{k=1}^{L} b_k(x_i x_{i-1} \ldots x_{i-D}) n_{i-k}$$

The value $\xi_i$ can be determined using the noise prediction $n_i$ for L previous time steps, the noise model coefficients $b_i$, and the $x_i$ values for D time intervals.

The noise $n_i = r_i - I_i$, where $I_i$ is the ideal signal, and $$I_i = \sum_{k=0}^{I} g_k x_{i-k}$$

for ISI length I.
Thus, $$n_i = r_i - \sum_{k=0}^{I} g_k x_{i-k}$$

Thus, $\Xi_i$ can be determined from the received values $r_i$ for L previous time steps, the inter-symbol interference coefficients $g_i$, the noise model coefficients $b_i$, and the $x_i$ values for L+I previous time steps.

The variance of $n_i$ can be expressed as follows:

$$\mathrm{var}(n_i) = \sigma^2(x_i x_{i-1} \ldots x_{i-D}) + \mathrm{var}\left(\sum_{k=1}^{L} b_k(x_i x_{i-1} \ldots x_{i-D}) n_{i-k}\right) > \mathrm{var}(\xi_i)$$

For maximum likelihood detection, we require to find $x_1, \ldots, x_N$ which maximises the probability $P(x_1' \ldots x_N' | r_1 \ldots r_n)$ We need to find $x_1, \ldots, x_N$ which minimises the path metric. Thus, it is necessary to calculate the branch metric $BM_i$ for each possible transition to a value of $x_i$:

$$BM_i = -2\ln P(\xi_i | r_i \ldots r_{i-L} x_i \ldots x_{i-D})$$
$$= \sum_{i=1}^{N} \left(\frac{1}{\sigma^2(x_i x_{i-1} \ldots x_{i-D})}\right)(\xi_i(x_i x_{i-1} \ldots x_{i-D}, r_i \ldots r_{i-L}))^2 +$$
$$\ln \sigma^2(x_i x_{i-1} \ldots x_{i-D})$$

As discussed above, $\xi_i$ can be determined using known coefficients, received values $r_i$ and the $x_i$ values for I+L previous time intervals.

To find $x_i, \ldots x_1$, we can use the Viterbi algorithm with an $2^I$-state main detector. Due to the smallness of the detector, we still require to find the values of x for the previous L time steps, $x_{i-I} \ldots x_{i-I+L}$, in order to calculate the branch metric. This can be done using L-step traceback from the state $x_{i-I} \ldots x_{i-I+S-1}$ of the $2^S$-state pre-detector. We assume in this example that the number of states in the pre-detector is smaller or equal than the number of states in the main detector, i.e. $S \leq I$ Thus, embodiments of the present invention differ from previous solutions by using a further likelihood detector, e.g. a pre-detector, to obtain, for each state of the main detector, estimated $x_i$ values for use in determining branch metrics in a main detector. The pre-detector will typically use a simpler noise model than the main detector, in order to allow it to operate with a lower latency, and supply the required data to the main detector at the required time.

Figure 6:
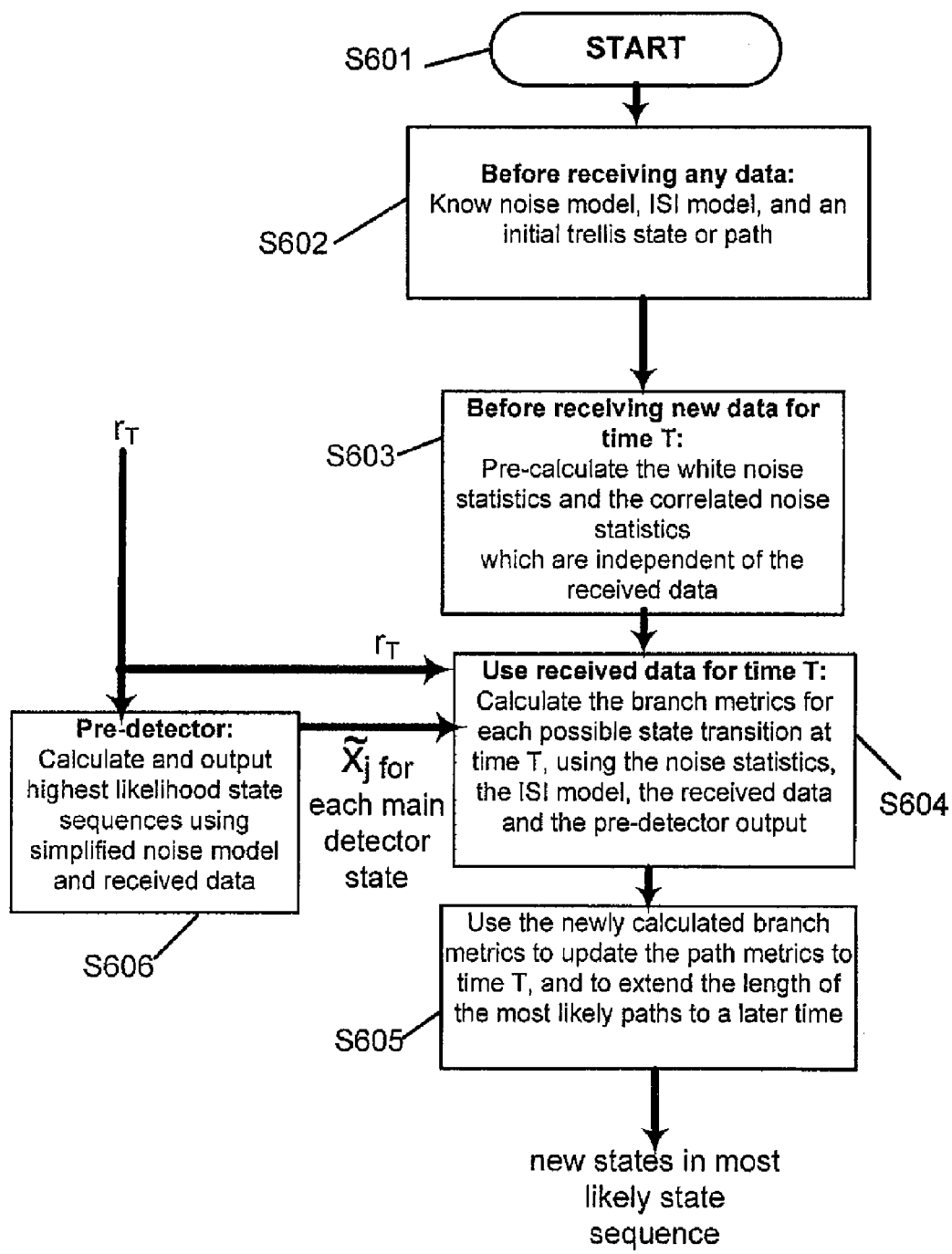
FIG. 6 is a flowchart, showing a method according to an embodiment of the invention.

FIG. 6 is a flowchart showing the calculation process in an embodiment of the invention. The process starts at step S601. At step S602, we know the noise model, the trellis structure, and an initial trellis state or path.

Next, at step S603, the following quantities are computed for each data pattern, using the noise model:
1) the noise correlation coefficients, b, which measure the correlation strength between the current noise sample and L most recent noise samples conditional on data pattern. Here L is Markov length.
2) $1\ln\sigma^2$
where $\sigma$ expresses the strength of the white noise component
3) $1/\sigma^2$ These statistics are preferably pre-computed and used in the following calculation of the branch metric.

The next step of the flow diagram is step S604, in which received data at time T is used to calculate corresponding branch metrics. At a time step i, a final state has two incoming braches. For each branch, to compute the path metric to state this final state, the main detector may use the branch metric given by Kavcic and Moura.

But we do not have perfect information on the $x_i$'s needed to determine the branch metrics. Therefore, the missing information is provided by the pre-detector.

The main detector now performs trace back to choose the most likely path leading to the final state. In this manner it determines the most likely sequence of $x_i$s for each possible final state.

At step S605, the path metric to each possible state is determined, being the minimum of the sum of path metric to each of the two initial states summed with the respective branch metric, in the usual Viterbi algorithm and the decision on which of the two branches was chosen is stored, to be used in trace back at next time step.

An example is now described, in which L=1, D=1 and I=1. We require information on $x_{i-L-I} \ldots x_{i-I-1}$, in order to be able to calculate the path metric.

In this case, the optimal Gauss-Markov Viterbi detector would have $2^{L+I} = 2^2 = 4$ states. These states are 11, 10, 01 and 00. However, the main detector in this example only has 2 states, i.e. 0 and 1. Thus the state transition in the main detector is from $x_{i-1}$ to $x_i$, and it does not include $x_{i-2}$ values. Estimates of the $x_{i-2}$ values are obtained from the pre-detector. In this example, the pre-detector performs a traceback from each possible state $x_{i-1}$ of the main detector, to obtain an estimate of $x_{i-2}$. In alternative embodiments, where earlier estimates of x values are also required, the pre-detector performs a longer traceback, i.e. it is required to perform an L-step traceback.

The branch metric for the main detector is calculated as follows. The prediction error $\xi_i$ can be calculated as:

$$\xi_i = n_i - b(x_i x_{i-1}) \cdot n_{i-1}$$
$$= (r_i - I_i) - b(x_i x_{i-1}) \cdot (r_{i-1} - I_{i-1})$$
$$= (r_i - g_o x_i - g_1 x_{i-1}) - b(x_i x_{i-1}) \cdot (r_{i-1} - g_o x_{i-1} - g_1 x_{i-2})$$

Due to the intersymbol interference length of I=1, the intersymbol interference can be expressed as $I_i = g_o x_i + g_1 x_{i-1}$
D=1 results in $\sigma_i = \sigma(x_i x_{i-1})$
L=1 results in $n_i = \sigma(x_i x_{i-1}) W_i - b(x_i x_{i-1}) n_{i-1}$
For example, for the branch (0→0) of the main detector trellis, we know that $x_i = 0$ and $x_{i-1} = 0$. To determine $\xi_i$, we also need to know $x_{i-2}$. This is obtained by the pre-detector, by tracing back from the state $x_{i-1}=0$.

In this embodiment, the pre-detector is a 2-state, white noise, data-independent Viterbi detector. Thus, the pre-detector branch metrics are calculated as follows:

$$BM_i = n_i^2 = (r_i - g_o x_i - g_1 x_{i-1})^2$$

For example, for the branch (0→0) of the predetector trellis, $BM=r_i^2$, and for the branch (1→1) of the predetector trellis, $BM=(r_i - g_o - g_1)^2$. The $g_i$ values will be known from the intersymbol interference model.

When the pre-detector branch metrics are calculated, these are used to update path metrics. The most likely paths are then selected using the Viterbi Algorithm. Preferably, traceback is performed backwards from $x_{i-1}$, for each possible branch of the trellis, to obtain corresponding values of $\hat{x}_{i-2}$, where the hat symbol denotes that the values is an estimate of $x_{i-2}$ obtained from the pre-detector.

Thus the pre-detector value $\hat{x}_{i-2}$, is used to calculate $\xi_i = r_i - b(0\ 0) \cdot (r_{i-1} - g_1 \hat{x}_{i-2})$ We can then determine $BM_i = (1/\sigma^2)\xi_i^2 + \ln \sigma^2$ for this particular branch of the main detector. A similar calculation may be performed for each of the other branches of the main detector trellis, to obtain branch metrics for each branch.

In embodiments where earlier previous values of $x_i$ are also required, the traceback in the pre-detector may also be used to provide these additional values to the main detector.

In another embodiment, L+I=3, the main detector has 4 states, and the pre-detector has 2 states. The bit $\hat{x}_{i-3}$ is needed by the main detector to calculate branch metrics, but is unknown, as the main detector calculate states back to $x_{i-2}$ $x_{j-1}$. Thus, the value of state $x_{j-2}$ is needed to determined the most likely $\hat{x}_{i-3}$ value from the pre-detector.

The pre-detector preferably outputs $\hat{x}_{i-3}$ values as a function of $x_{i-2}$ to allow appropriate $\hat{x}_{i-3}$ values to be used for different branches of the trellis in the main detector. This local traceback has been found to give better results than absolute determination of the most likely $\hat{x}_{i-3}$ value in the pre-detector. The conditional knowledge of $\hat{x}_{i-3}$ dependent on the value of $x_{i-2}$ fits in better with the noise model compared with the optimal value of $\hat{x}_{i-3}$ in a white noise (pre-detector) environment.

In prior art hard disk devices, the most popular approach is to calculate the maximum size of L and D that can be afforded, given the system resources and specification. However, embodiments of the present invention provide the advantage of allowing a lower power consumption, which may be critical for some applications, such as portable computing devices, e.g. MP3 players.

There is no issue with feedback loops in the present invention, because the pre-detector provides the earlier data, rather than a feedback loop to the traceback unit of the main detector.

In embodiments where the main detector is larger than or as large as the pre-detector, the pre-detector may calculate and output a value of $x_{j-L}\ x_{j-L+1}\ \ldots\ x_{j-1}$ for each possible state $x_j$ $x_{j+I}\ \ldots\ x_{j+I-1}$ of the main detector. For example, if the pre-detector and the main detector trellis each have two bits, then the output will be calculated dependent on the oldest two bits of the main detector trellis, rather than the oldest single bit. Thus, for each time interval, it may output a plurality of conditional x values for that time interval. This output may be stored in a memory before being used by the main detector. For example, a pipelined structure may be used, to hold each output value for an appropriate amount of time before feeding it through to the main detector for use in calculating branch metrics.

If the pre-detector is larger than the main detector, the pre-detector may then output values of $x_{j-1}$ for each possible branch of the main detector, e.g. dependent not simply on the state, but on most recent transition x. For example, if the pre-detector states have three bits and the main detector states have two bits, then the output will be calculated dependent on the main detector state and the most recent transition bit rather than on the main detector state alone.

It is not essential to use the same equaliser for the main detector and the predetector, thus the values of $r_i$ received by each may differ. However, in some embodiments, the same values of $r_i$ may be supplied to both detectors.

The pre-detector preferably has a very small latency, and thus in some embodiments, its output can be used for other purposes as well as for providing data to the main detector. For example, the pre-detector output may be used for time recovery purposes, such as when a timing loop in the read channel requires preliminary decisions. Another possible use is for dynamic data adaptation, e.g. programming coefficients in the equaliser dynamically, depending on the preliminary decisions. A further possible use is for statistics tracking, e.g. to calculate statistics such as $\sigma$ and b using correlation properties of the noise. Any combination of these additional uses may be implemented within an embodiment of the invention.

Figure 7:
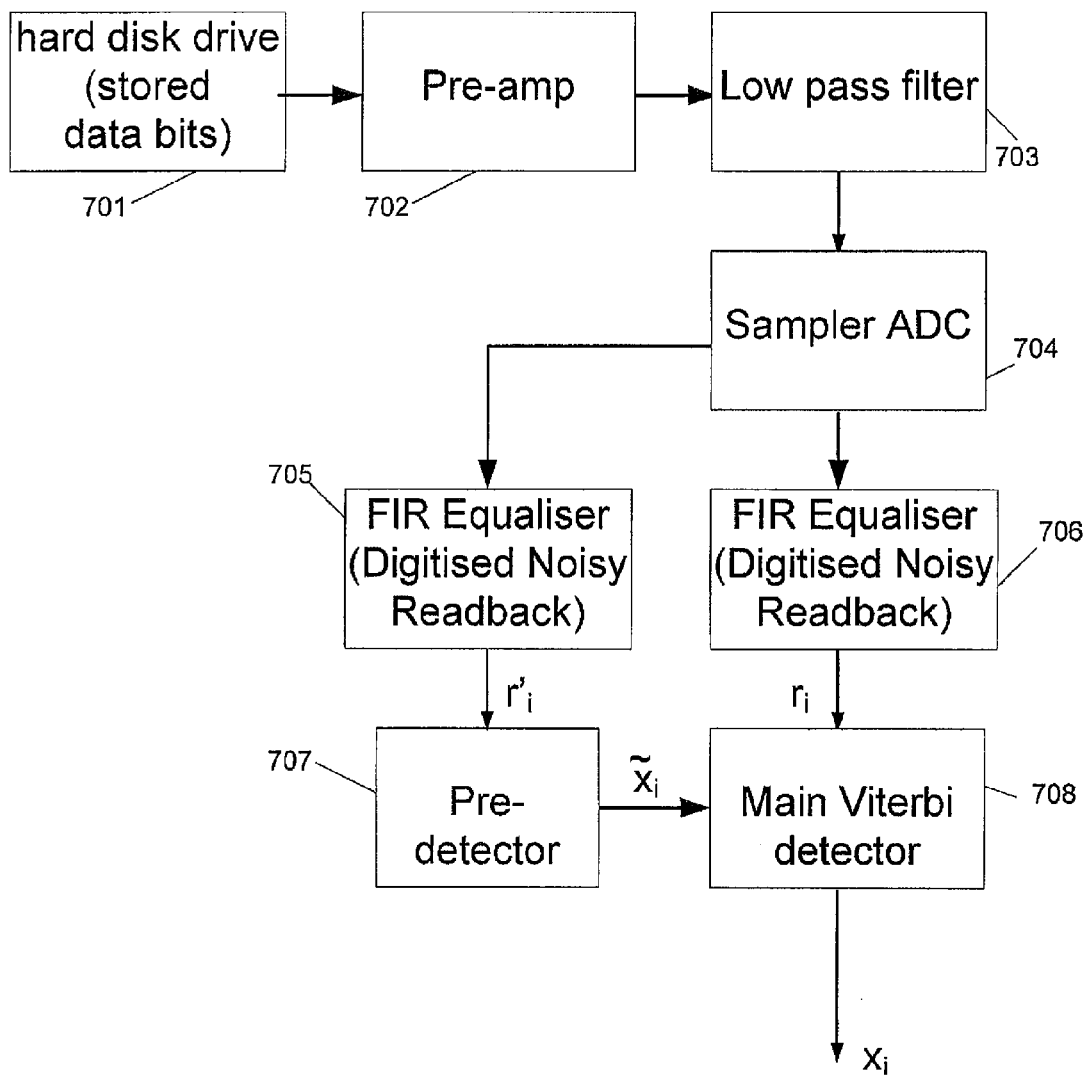
FIG. 7 is a block diagram of a hard disk drive read system using a likelihood detector according to an embodiment of the invention.

FIG. 7 shows a block diagram of an apparatus according to a further embodiment of the invention, in which different equalisers are used for the main detector and the pre-detector. The apparatus in this example relates to a hard disk drive system, although it is possible that different equalisers may be used in other types of system. The apparatus includes a hard disk drive 701, with stored data bits. The read output from the disk 701 is sent to a pre-amp 702, then to a low pass filter 703. Next, the data is passed to a sampler ADC 704, from which it is passed to two different equalisers 705 and 706. The output of equaliser 705 is shown as $r'_i$, and is processed by the pre-detector 707. The output of equaliser 706 is shown as $r_i$, and is processed by the main detector 708. The pre-detector 707 outputs estimates $x_i$ of the stored data sequences, using a simplified noise model, and sends it to the main detector 708. The main detector then outputs a higher quality estimate of the stored data sequence, using its more sophisticated noise model.

Figure 8:
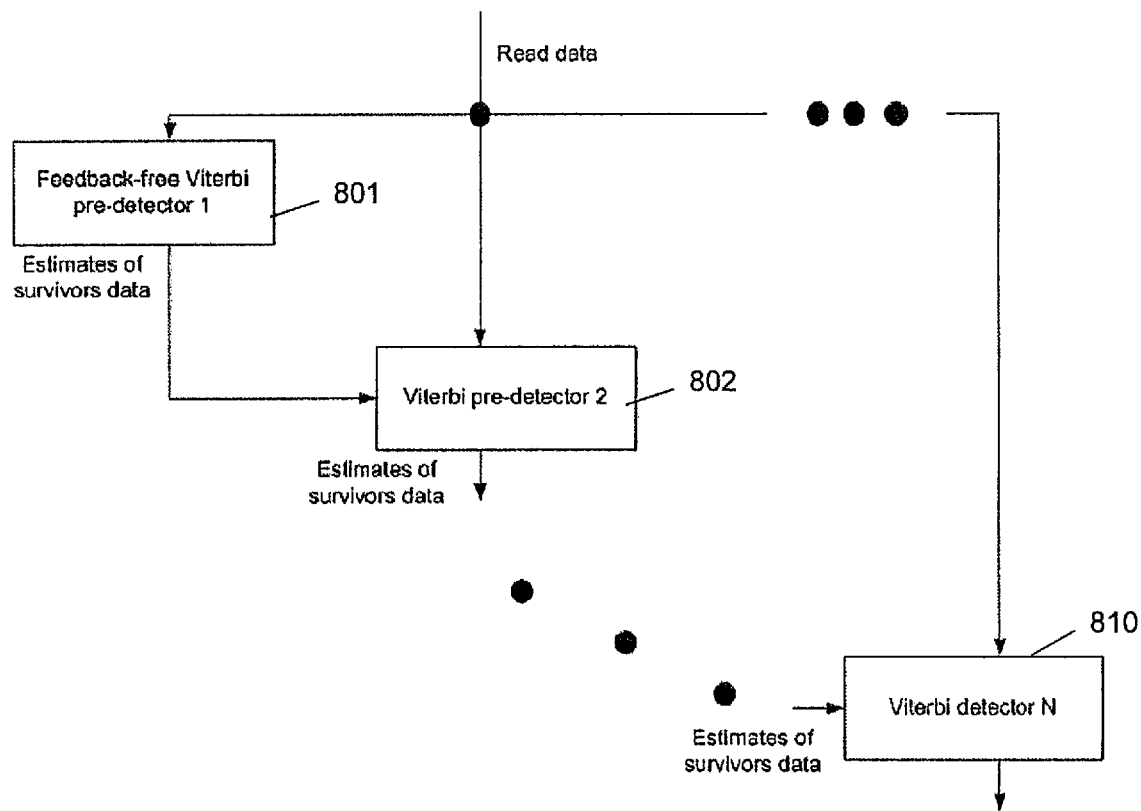
FIG. 8 is a block diagram of a nested likelihood detector according to an embodiment of the invention.

FIG. 8 shows an embodiment in which multiple cascaded detectors are used. A first noise-prediction feedback free Viterbi pre-detector 801 receives read data, and calculates estimates of survivor data. It passes these estimates to a second Viterbi pre-detector, which uses them together with the read data to output its own estimates of survivor data. This may be output to further intermediate detectors, cascaded in a similar way. Finally, an N-th Viterbi detector receives the survivor data from the (N−1)-st pre-detector, and outputs a most likely sequence of states corresponding to the read data.

The traceback process in the above examples is performed using the Viterbi algorithm. However, it is alternatively possible to use modifications of the Viterbi algorithm to perform the traceback.

The present invention is not limited to radix-2, and may also include radix 4, radix 8, radix 16, radix 32 and other values of the radix. For example, for radix 4, the traceback is over blocks of two time intervals, instead of being over single time intervals.

Although embodiments described have all used hard inputs and hard outputs, it is also possible to use embodiments of the invention with soft inputs and/or soft outputs, e.g. by retaining multiple paths where the path metric difference falls below a threshold value.

The present invention may be implemented as a dedicated semiconductor chip. Embodiments of the invention may be constructed using at least one standard cell. A standard cell is a logic unit which may be used as a building block for building more complex circuits. Standard cells may be made available as selections from a standard cell library. A customised selection of logic units from the library may be provided on a single chip to allow simplification of a particular implementation of the logic units. In addition, embodiments of the invention may be provided as standard cells, and made available within a standard cell library. However, the present invention is not limited to such a technology or design. A further embodiment of the invention is an integrated circuit including any detector according to the invention. The invention also encompasses circuit boards including any detector according to the invention, and digital electronic devices including any detector according to the invention.

The present invention can be implemented by software or programmable computing apparatus. This includes any computer, including PDAs (personal digital assistants), mobile phones, etc. Thus the present invention encompasses a carrier medium carrying computer readable code for configuring a computer or number of computers as the apparatus of the invention. The carrier medium can comprise a transient medium, e.g. an electrical, optical, microwave, RF, electromagnetic, acoustic or magnetic signal (e.g. a TCP IP signal over an IP network such as the internet), or a carrier medium such as a floppy disk, CD ROM, hard disk, or programmable memory device.

The code for each process in the methods according to the invention may be modular, or may be arranged in an alternative way to perform the same function. The methods and apparatus according to the invention are applicable to any computer.

The present invention can be used in a wide range of communications technology, including 3G cellular technology (e.g. CMDA2000, W-CDMA, TD-SCDMA), digital video broadcasting (DVB), digital audio broadcasting (DAB), broadband wireless (e.g. LMDS—local multipoint distribution service), multipoint multichannel distribution service (MMDS), wireless LAN (local area network) such as WLAN-802.11a, digital subscriber line technology (xDSL), cable modem and satellite communications.

The present invention may also be applied in other fields of technology where Viterbi detectors are used.

While the invention has been described in terms of what are at present its preferred embodiments, it will be apparent to those skilled in the art that various changes can be made to the preferred embodiments without departing from the scope of the invention, which is defined by the claims.

The invention claimed is:

1. A likelihood detector apparatus to receive a stream of data values from a data medium, wherein the received data values correspond to ideal values but may include added noise that is dependent on previous noise and dependent on data on the data medium, said ideal values being determined by possible values of data on the medium, and to output information that specifies a sequence of states corresponding to the stream of received data values, said sequence of states corresponding to possible data values on the medium, the apparatus comprising:

a first detector, which uses silicon area and is configured to calculate state sequence likelihood information based on a first noise model and received data values, and configured to provide said state sequence likelihood information to a second detector;

said second detector, which is configured to calculate weighting values indicating likelihoods that a data value received at a particular time corresponds to a particular state transition, based on a second noise model, received data values, and state sequence likelihood information from the first detector;

a traceback unit configured to determine a most likely sequence of data values using said calculated weighting values; and an output configured to output information that specifies said determined sequence of states, wherein the first detector is configured to receive a data input corresponding to said stream of data values from a first equalizer and the second detector is configured to receive a data input from a second equalizer.

2. The likelihood detector of claim 1, wherein the first noise model is a simpler noise model than the second noise model.

3. The likelihood detector of claim 1, wherein the first noise model is white noise, correlated noise and/or data dependent noise with smaller Markov length and/or smaller data dependence length than in the second noise model, and the second noise model is correlated and/or data dependent noise with larger Markov length and/or larger data dependence length than in the first noise model, and non-Markov noise.

4. The likelihood detector of claim 1, wherein the second detector is configured to use local traceback data obtained from the first detector to calculate branch metrics.

5. The likelihood detector of claim 1, wherein the first detector is configured to output state sequence likelihood information for a plurality of possible states of the second detector.

6. The likelihood detector of claim 1, wherein a latency of the first detector is smaller than a latency of the second detector.

7. The likelihood detector of claim 1, wherein an output of the first detector is also used to dynamically determine equalizer co-efficients.

8. The likelihood detector of claim 1, wherein an output of the first detector is also used for statistics tracking purposes.

9. The likelihood detector of claim 1, further comprising at least a third detector, configured with the first and second detector to provide a series of cascaded multiple detectors.

10. The likelihood detector of claim 1, further comprising a noise calculator configured to obtain or to calculate noise statistics for possible sequences of data values on the medium using said second noise model.

11. A likelihood detector apparatus to receive a stream of data values from a data medium, wherein the received data values correspond to ideal values but may include added noise that is dependent on previous noise and dependent on data on the data medium, said ideal values being determined by possible values of data on the medium, and to output information that specifies a sequence of states corresponding to the stream of received data values, said sequence of states corresponding to possible data values on the medium, the apparatus comprising:

a first detector, which is configured to calculate state sequence likelihood information based on a first noise model and received data values, and configured to provide said state sequence likelihood information to a second detector;

said second detector, which uses silicon area and is configured to calculate weighting values indicating likelihoods that a data value received at a particular time corresponds to a particular state transition, based on a second noise model, received data values, and state sequence likelihood information from the first detector;

a traceback unit configured to determine a most likely sequence of data values using said calculated weighting values; and an output configured to output information that specifies said determined sequence of states, wherein an output of the first detector is also used for time recovery purposes in a read channel timing loop.

12. The likelihood detector of claim 11, further comprising a pipeline memory configured to feed output data from the first detector to the second detector.

13. A likelihood detection method of receiving a stream of data values from a data medium, wherein the received data values correspond to ideal values but may include added noise that is dependent on previous noise and dependent on data on the data medium, said ideal values being determined by possible values of data on the medium, and outputting information specifying a sequence of states corresponding to the stream of received data values, said sequence of states corresponding to possible data values on the medium, the method comprising:

using a first detector to calculate state sequence likelihood information based on a first noise model and received data values, and providing said state sequence likelihood information to a second detector;

using said second detector to calculate weighting values indicating likelihoods that a data value received at a particular time corresponds to a particular state transition, based on a second noise model, received data values, and output data from the first detector;

determining a most likely sequence of data values using said calculated weighting values; and outputting information specifying said determined sequence of states, wherein the first detector receives a data input corresponding to said stream of data values from a first equalizer and the second detector receives a data input from a second equalizer.

14. The method of claim 13, wherein the first noise model is a simpler noise model than the second noise model.

15. The method of claim 13, wherein the first noise model is selected from a group of white noise, correlated noise and/or data dependent noise with smaller Markov length and/or smaller data dependence length than in the second noise model, and the second noise model is selected from a group of correlated and/or data dependent noise with larger Markov length and/or larger data dependence length than in the first noise model, and non-Markov noise.

16. The method of claim 13, wherein the second detector uses local traceback data obtained from the first detector to calculate branch metrics.

17. The method of claim 13, wherein the first detector outputs state sequence likelihood information for a plurality of possible states of the second detector.

18. The method of claim 13, wherein a latency of the first detector is smaller than a latency of the second detector.

19. The method of claim 13, wherein an output of the first detector is also used to dynamically determine equalizer coefficients.

20. The method of claim 13, wherein an output of the first detector is also used for statistics tracking purposes.

21. The method of claim 13, further comprising at least a third detector, configured with the first and second detector to provide a series of cascaded multiple detectors.

22. The method of claim 13, further comprising obtaining or pre-calculating noise statistics for possible sequences of data values on the medium before receiving at least part of said stream of data values, using said second noise model.

23. A likelihood detection method of receiving a stream of data values from a data medium, wherein the received data values correspond to ideal values but may include added noise that is dependent on previous noise and dependent on data on the data medium, said ideal values being determined by possible values of data on the medium, and outputting information specifying a sequence of states corresponding to the stream of received data values, said sequence of states corresponding to possible data values on the medium, the method comprising:

using a first detector to calculate state sequence likelihood information based on a first noise model and received data values, and to provide said state sequence likelihood information to a second detector;

using said second detector to calculate weighting values indicating likelihoods that a data value received at a particular time corresponds to a particular state transition, based on a second noise model, received data values, and output data from the first detector;

determining a most likely sequence of data values using said calculated weighting values; and outputting information specifying said determined sequence of states, wherein an output of the first detector is also used for time recovery purposes in a read channel timing loop.

24. The method of claim 23, further comprising pipelining output data from the first detector to the second detector.

25. A Viterbi detector apparatus to receive a stream of data values that correspond to ideal values but may include added noise, and to output information that specifies a sequence of states corresponding to the stream of received data values, the apparatus comprising:

a first Viterbi detector, which is configured to calculate state sequence likelihood information based on a first noise model and received data values, and configured to provide said state sequence likelihood information to a second Viterbi detector;

said second Viterbi detector, which uses silicon area and is configured to calculate branch metrics based on a second noise model, received data values, and state sequence likelihood information from the first detector;

a traceback unit configured to determine a most likely sequence of data values using said branch metrics; and an output configured to output information that specifies said determined sequence of states, wherein the first Viterbi detector is configured to receive a data input corresponding to said stream of data values from a first equalizer and the second Viterbi detector is configured to receive a data input from a second equalizer.

26. A likelihood detector apparatus configured to receive a stream of data values from a data medium, wherein the received data values correspond to ideal values but may include added noise that is dependent on previous noise and dependent on data on the data medium, said ideal values being determined by possible values of data on the medium, and to output information that specifies a sequence of states corresponding to the stream of received data values, said sequence of states corresponding to possible data values on the medium, the apparatus comprising:

a first pre-detector configured to calculate state sequence likelihood information based on a first noise model and received data values, and to provide said state sequence likelihood information to one or more further pre-detectors;

said one or more further pre-detectors, each further pre-detector configured to calculate state sequence likelihood information based on a noise model, received data values and an output from another pre-detector, and to provide said state sequence likelihood information to another of said pre-detectors or to a main detector;

said main detector, which uses silicon area and is configured to calculate weighting values indicating likelihoods that a data value received at a particular time corresponds to a particular state transition, based on a second noise model, received data values, and state sequence likelihood information from one of said pre-detectors;

a traceback unit configured to determine a most likely sequence of data values using said calculated weighting values; and an output configured to output information that specifies said determined sequence of states.

\* \* \* \* \*